A. D. HANSEN.
AUTOGRAPHIC CAMERA.
APPLICATION FILED MAR. 7, 1916.
1,269,432.
Patented June 11, 1918.
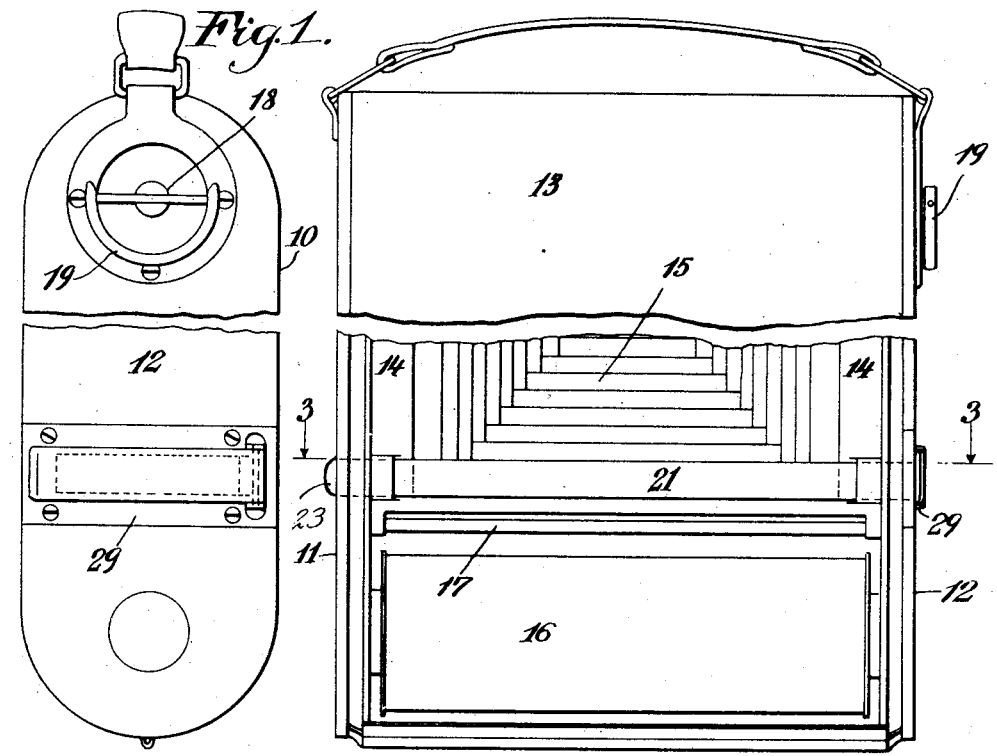
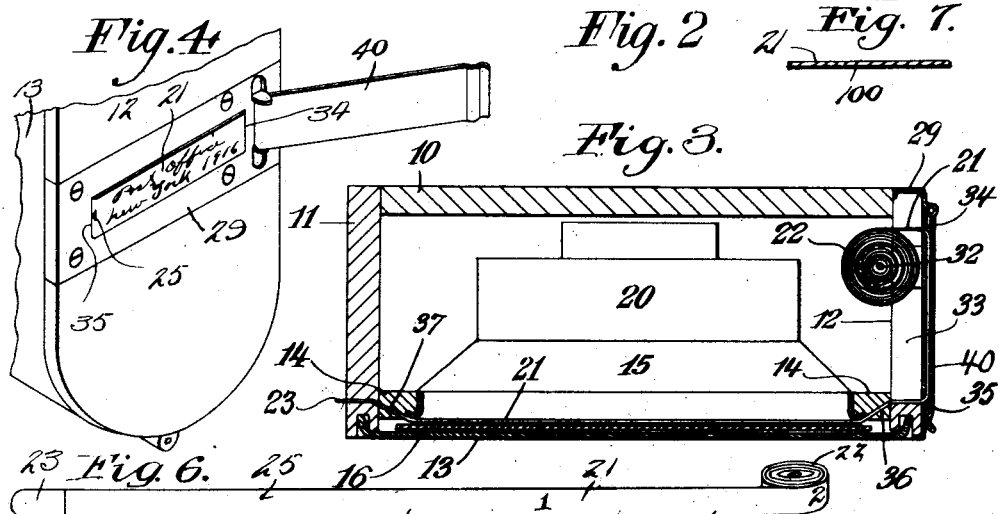
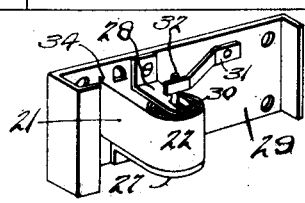
Axel Dalgaard Hansen Inventor
By his Attorney
Ivan E. C. Konigsberg ance I have used mica and celluloid coated
UNITED STATES PATENT OFFICE.

AXEL DALGAARD HANSEN, OF CAMILLUS, NEW YORK.

AUTOGRAPHIC CAMERA.

1,269,432.

Specification of Letters Patent. Patented June 11, 1918.

Application filed March 7, 1916. Serial No. 82,569.

*To all whom it may concern:*

Be it known that I, AXEL DALGAARD HANSEN, citizen of the Danish Monarchy, residing in Camillus, in the county of Onondaga and State of New York, have invented certain new and useful Improvements in Autographic Cameras, of which the following is a specification.

This invention relates to improvements in autographic cameras in which provision is made for autographing or describing each picture by writing upon the film and exposing the written portion to permit the writing to be photographed.

The object of this invention is to provide means whereby the autographing may be done upon a separate material and in a manner which does not require any separate exposure of the autograph. The advantages of this invention are that ordinary films may be used for autographing, whereas, with the present autograph cameras specially prepared autographic films must be used, which become light-struck very easily due to the thin special film protecting papers required for the autographic operation. Again, this invention permits the autographing to be done without any special attention as to whether or not the sun shines upon the material upon which the autograph is being written and the operation may be done slowly or quickly as desired.

It is a further object of the invention to provide a simple, practical and inexpensively made apparatus for carrying out the objects.

Further advantages of the invention and other objects thereof will appear as this specification proceeds, while reference is had to the accompanying drawings, in which—

Figure 1 is a side view of a camera embodying the invention with parts broken away.

Fig. 2 is a rear view of the camera parts being broken away to show the interior.

Fig. 3 is a transverse sectional view on line 3—3 of Fig. 2.

Fig. 4 is a perspective outside fragmentary view of part of the improvement.

Fig. 5 is a perspective inside view of the plate and bracket for supporting the material upon which the autograph is written.

Fig. 6 is a perspective view of the autographic material.

Fig. 7 is a view of a portion of the autograph material.

Only so much of a camera is shown in the drawing as is necessary to an understanding of the invention. Accordingly, the reference numeral 10 denotes the front of the camera, 11 and 12 are the sides, and 13 the back. 14 represents the bellows frame and 15 the bellows. 16 is the film cartridge at the bottom and 17 is the thin metal roller over which the film passes upward to the top roller on the usual shaft 18, Fig. 1, for advancing the film by means of the handle 19. 20 represents the lens mechanism. All of these parts may be of any usual or desired construction.

The main idea of this invention is to write the autograph upon a suitable piece of material and place the latter between the film and the lens mechanism, so that upon exposure for a picture the autograph will be photographed upon the film without requiring any further attention by the operator. In plate cameras this may be done for each exposure very readily, as the camera is opened for each exposure and the plates changed. But for film cameras a different method is required, because once the film is inserted, the camera cannot be opened without danger of spoiling the film.

In the present instance I propose to write upon a material, preferably in the form of a strip or band 21, see Fig. 6, and which will hereinafter and in the claims be called an autograph plate as a matter of convenient description. The autograph plate is adapted to be wound into a roll 22 and the end 23 is preferably reinforced as shown. The strip 21 is divided into spaces 24 which are numbered and each of which forms an individual autograph plate. 25 represents a starting indicator.

I have found several materials suitable for use as an autograph plate. Preferably I use a translucent or transparent material and coat it with a substantially opaque coating of a kind which is easily removable when written upon with a stylus or other suitable instrument or tool. Thus for instance I have used mica and celluloid coated with a water color which may be scratched very easily when writing the autograph. A transparent paper may be used coated with a color mixed with chalk or the like, somewhat similar to the paint used for whitening or whitewashing windows when it is desired to darken them or for other purpose. Again, the material may be left uncoated and written upon with an opaque ink or color, or a substance sufficiently opaque to cause the autograph to be clearly seen on the finished picture. I have obtained good results by using a parchment and writing upon it with ordinary ink. Preferably the material will be paper but a fabric or other substance may be used. Again, I may use thin red film protecting paper and write upon it with a stylus which sufficiently penetrates the paper to permit the light to pass through the written portions and cause the autograph to be photographed.

The autograph plate 21 is mounted in the form of a roll in suitable brackets 27 and 28, Fig. 5, upon the inside of a plate 29 adapted to be secured to the camera. For purposes of renewal the one bracket, as 28, may be slotted as at 30 and a spring 31 keeps the pintle or shaft 32 of the roll 22 in place. Any other suitable means for mounting the autograph plate may be used. The plate 29 is screwed on to the side of the camera as shown in Figs. 1, 3 and 4 and correspondingly the side 12 of the camera will be cut away to fit the plate as at 33 in Fig. 3.

The autograph plate is passed through a slit 34 in the plate 29, outside on the latter, thence inwardly through another slit 35 in the plate. Thence through a slot 36 in the camera side and bellows frame. From there across the camera out through a similar slot 37 on the opposite side. This is done very easily because of the reinforced end 23 of the material which projects outside the camera to the left so as to form a tab which the user takes hold of to pull the material 21 through. It is also obvious that the autograph plate 21 is inserted before the film cartridge, so the manipulations set forth may be done with the back of the camera removed as in Fig. 2. The material is pulled through until the starting mark 25 is at the slit 35 as seen in Fig. 4. Thereafter a door 40 pivoted to the plate 29 is closed and the material 21 is then protected. The door 40 will be a snap door of any well known design. Thereafter the film 16 is unwound from the cartridge in the usual manner and the camera closed, when the autograph plate will lie close to the film and between the latter and the lens mechanism as seen in Fig. 3.

When it is desired to take and autograph a picture the film is manipulated as usual. Thereafter the door 40 is opened and the autograph written upon the autograph plate as shown in Fig. 4, the plate 29 forming a good platen for the writing. The autograph plate is then pulled through the camera until the numeral one thereon appears at the slit 35 which indicates that the autograph plate is properly placed within the camera. The strip projecting outside on the left may be torn off, care being taken to leave a small tab as at the start. When now the photograph is taken it is obvious that the autograph will be photographed on the film and when thereafter the picture is printed it will contain the autograph and the object of the invention has been accomplished.

In Fig. 7 I have shown the autograph negative as consisting of a coated material and at 100 indicated where the coating has been removed or broken to permit the light to penetrate for the printing.

It will be seen that it requires but little mechanism to use the autograph plate which may be an individual plate or in the form of several plates in one length and flexible and the term autograph plate is to be taken as meaning either form. Again, the method of autographing pictures by using my invention includes of course the printing of the picture in the usual manner. The bracket plate 29 practically carries all the parts and is easily secured to the camera. Other modifications and changes will quickly suggest themselves to the skilled camera worker. Thus, for instance, it may be desirable to operate the autograph plate on rollers similar to the film. I therefore do not wish to limit myself to the precise construction described and illustrated, but claim all changes and modifications within the principle of invention and the scope of the claims.

I claim:

1. An autograph plate of the character described consisting of a piece of non-opaque material provided with a coating of opaque easily removable substance, said autograph plate being divided into equal numbered spaces and having a starting point printed thereon in a predetermined position.

2. A camera having an opening in one of its sides and a plate secured thereto to close said opening, said plate being provided with means to support a supply roll of inscription receiving material within the camera and with an aperture through which such material may be passed to the outside of said plate to receive an inscription and with a second aperture through which the inscribed portion of such material may be returned within the camera, means within the camera for guiding the inscribed portion of said material into printing relation with a sensitized element contained in said camera, and a cover for protecting that portion of the inscription material which is exposed on the exterior of said plate.

Signed at Camillus in the county of Onondaga and State of New York this 2d day of March, A. D. 1916.

AXEL DALGAARD HANSEN.